July 12, 1949.                A. T. CHAPMAN ET AL                2,475,877
                    METHOD OF TREATING MATERIAL IN LAMINAR FORM
Filed Oct. 9, 1942                                              7 Sheets-Sheet 1

INVENTORS
A.T. CHAPMAN
V.F. D'AGOSTINO
BY
E.R. Noonan
ATTORNEY

FIG.2

INVENTORS
A.T. CHAPMAN
V.F. D'AGOSTINO
BY
E.R. Nowlan
ATTORNEY

July 12, 1949.   A. T. CHAPMAN ET AL   2,475,877
METHOD OF TREATING MATERIAL IN LAMINAR FORM
Filed Oct. 9, 1942   7 Sheets-Sheet 6

INVENTORS
A. T. CHAPMAN
V. F. D'AGOSTINO
BY
ATTORNEY

July 12, 1949.  A. T. CHAPMAN ET AL  2,475,877
METHOD OF TREATING MATERIAL IN LAMINAR FORM
Filed Oct. 9, 1942  7 Sheets-Sheet 7

INVENTORS
A. T. CHAPMAN
V. F. D'AGOSTINO
BY
E. R. Nowlan
ATTORNEY

Patented July 12, 1949

2,475,877

UNITED STATES PATENT OFFICE 2,475,877

METHOD OF TREATING MATERIAL IN LAMINAR FORM

Alan T. Chapman, Clifton, N. J., and Vincent F. D'Agostino, Brooklyn, N. Y., assignors to Western Electric Company, Incorporated, New York, N. Y., a corporation of New York Application October 9, 1942, Serial No. 461,490

2 Claims. (Cl. 117—38)

This invention relates to a method of treating material in laminar form, and more particularly to a method of making laminae of mica partially coated with silver for use in electrical condensers.

One type of electrical condenser much used in various electrical arts and particularly in the arts of radio and telephone communications apparatus, comprises as its electrically operative structure a pile or stack of luminae of mica each coated on one or both sides with an adherent, thin coating of metal, preferably silver. Ordinarily such a coating should extend over the surface of the lamina on which it is applied to only one edge. There should be a strip of uncoated mica along each of the other three edges.

One object of the present invention is to provide a simple, rapid and reliable method of manufacturing such partially coated laminae by substantially continuous process.

With the above and other objects in view, the invention may be embodied in a method comprising steps of advancing a pair of parallel tapes, applying an adhesive along the upper faces of the same, applying mica laminae in succession on the tapes with the front edges of each laminae overlapping the rear edge of the preceding laminae, advancing a second pair of mutually parallel tapes respectively along and above and in the same direction as the first pair of tapes, applying adhesive to the under faces of the second pair of tapes, bringing the second pair of tapes down upon the overlapped laminae carried by the first pair of tapes, and pressing each tape of each pair toward the corresponding tape of the other pair to cause the sequence of overlapped laminae to be adhered to and held assembled in overlapped relationship by the four tapes which also then act to cover or mask corresponding strips of the laminae on both sides of both edges of the overlapped sequence. This assembly of tapes and overlapped laminae may then be rolled up or may be cut into lengths and stacked, for storage or transfer, or may be an article of commerce as such.

In the completed method, the same sequence of steps is performed except for the rolling or stacking of the assembly. Instead, the advancing assembly is coated on one or both sides as desired, with a suitable preparation of silver material in a volatile vehicle, the wet coated assembly is dried to drive off the vehicle, the dry coated assembly is heated to convert the coating material into a film of metallic silver adherent on the unshielded or unmasked portions of the coated surfaces, and the coated laminae are removed from the tapes or from their debris.

Other objects and features of the invention will appear from the following detailed description of embodiments of the invention taken in connection with the accompanying drawings in which the same reference numerals are applied to identical parts in the several figures and in which.

Figures 15, 16, 17:
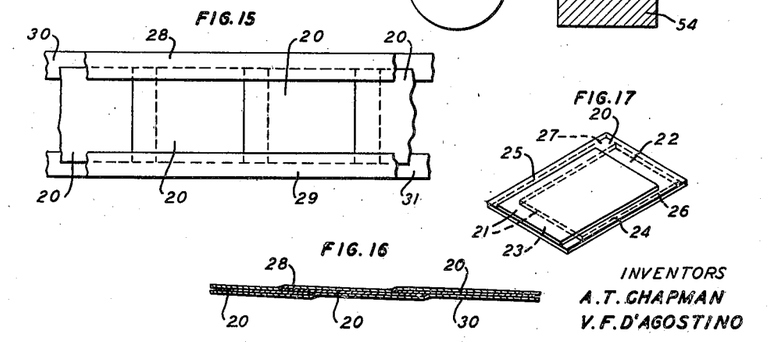
Fig. 15 is a plan view of a portion of an assembly of tapes and laminae.
Fig. 16 is an edge view of the showing of Fig. 14.
Fig. 17 is a view in perspective of a completed, coated lamina.

The ultimate purpose of the invention is the production in substantially continuous fashion of the article illustrated in Fig. 17, in which figure the thicknesses of the lamina and its coatings have been exaggerated for clarity, as is also the case in Figs. 15 and 16. The article shown in Fig. 17 is a lamina 20 of mica having on each side a closely adherent thin and substantially continuous film 21 of metallic silver. Such metal coated laminae of dielectric material are extensively used in the electrical arts, either singly or as a plurality piled or stacked on top of each other, as the capacitative element of an electrical condenser. For this purpose it is usually preferable that the silver film 21 on either face of the lamina extend to one edge of the mica lamina and that the film on the other side extend to the opposite edge of the lamina, while a strip of the lamina adjacent to each of the other three edges of each face is to be left bare. To make such laminae generally, the uncoated laminae are provided, over the areas where the metal films are to be, with a coating of a suitable metalliferous paint or paste or the like, comprising a finely divided elemental metal or suitable compound of a metal together with a suitable fluxing material, a vehicle and, if necessary, volatile solvent or drier or other accessory ingredient. One composition suitable for this purpose may contain dispersed metallic silver or silver oxide or one or another easily decomposable salt of silver such as silver acetate or a mixture of these, together with a fluxing substance, e. g. Kauri gum and cadmium borate, in a slight amount of an oil vehicle or of a pyroxylin in amyl alcohol vehicle, or the like. Such a paste is in the commercial market at present, readily prepared, manufactured by a DuPont company, and known as V-11 DuPont silver paste. The paste may be applied by hand with a brush or by rolling, stamping, printing, spraying, or in any suitable manner. Ordinarily one coating, with the DuPont paste at least, is sufficient. However, with some pastes or where a film of unusually high conductivity is desired, more than one coating may be applied. The coated laminae are then air dried if necessary, though in some cases they may go directly from the pasting to be baked.

The pasted laminae are then baked, preferably at a temperature rising to from 900°–1200° F. This baking reduces any combined silver in the paste to metal and deposits all the silver on the face of the mica as a closely adherent and continuous film of substantially pure metal adhered to the mica by the product of the partly decomposed flux, while the vehicle, solvent if any, etc. are driven off, decomposed or burned away.

To enable the mass production of such coated laminae by substantially continuous process, one principal object of the invention is to produce the intermediate product illustrated in Figs. 15 and 16. This consists of a sequence of indefinite length of identically similar mica laminae 20 so arranged that (going from right to left) the rear portion of each lamina is overlapped by the front portion of next lamina behind to cover or mask in this fashion the transverse strips 22 and 23 respectively along the front edge of the bottom surface and along the rear edge of the top surface of each lamina, which are to be left uncoated in the final product. To cover or mask the two lateral top strips 24 and 25 and the two lateral bottom strips 26 and 27, tapes 28, 29, 30 and 31 are applied along the two lateral upper and lower edge portions of the sequence of laminae 20, as best shown in Figs. 15 and 16, with some suitable adhesive material between the tapes and laminae. The tapes may be of thin, flexible, tough metal, e. g. aluminum, copper, soft brass, or the like which will not materially melt or soften at the temperature at which the raw coated laminae are baked. Or the tapes may be of paper, or woven or braided textile, or of a cellulose plastic or other like material which will be substantially completely consumed during the baking or will leave a non-adherent residue. Adhesive compounds and mixtures suitable to secure the tapes to the laminae are too various and numerous to make any attempt to describe and classify them here. However, one material suitable for use with either metallic or non-metallic tapes is a simple, commercially available, petroleum wax, having a melting point between 155° F. and 165° F. and which is softish and faintly tacky between the fingers at 70° F. to 80° F.

Figure 1:
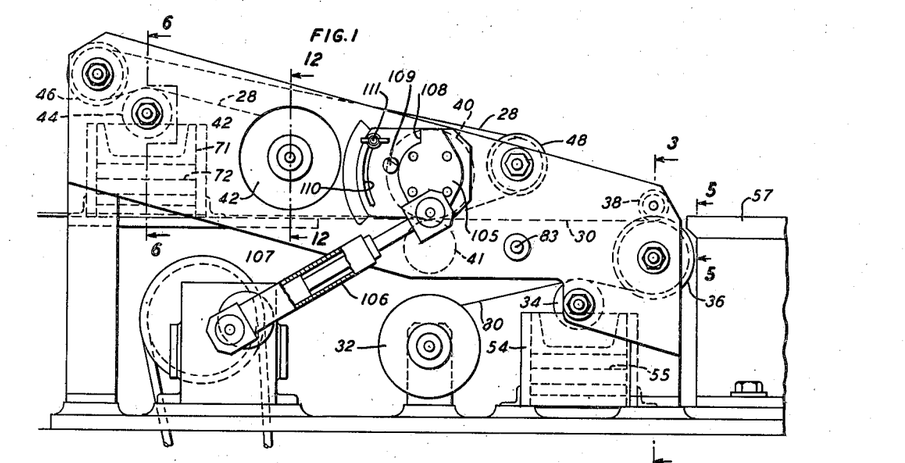
Fig. 1 is a broken view in side elevation of the principal portion of a machine constructed to carry out the method of the invention.
Figure 2:
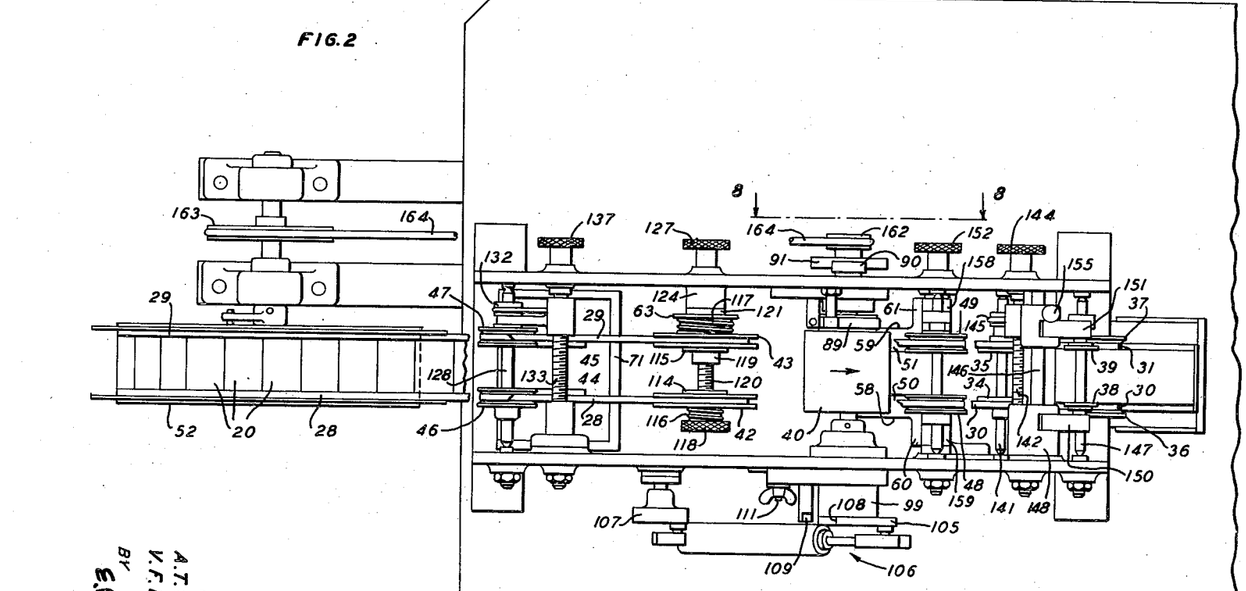
Fig. 2 is an extended plan view of the showing of Fig. 1.
Figure 12:
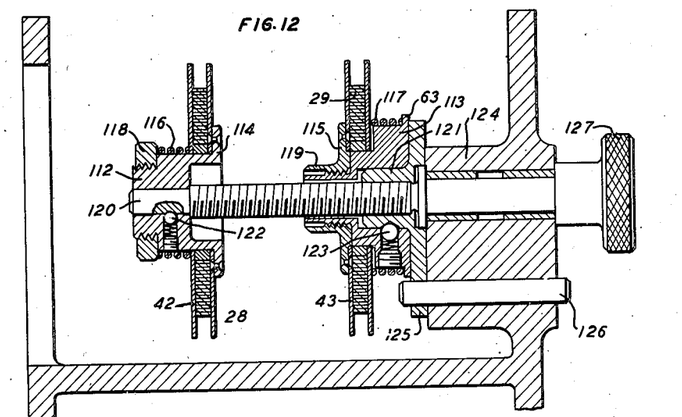
Fig. 12 is a section on the line 12—12 of Fig. 1.
Figure 13:
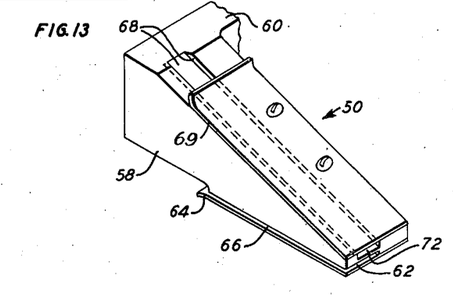
Fig. 13 is a detached perspective view of one of the tape guides.
Figure 14:
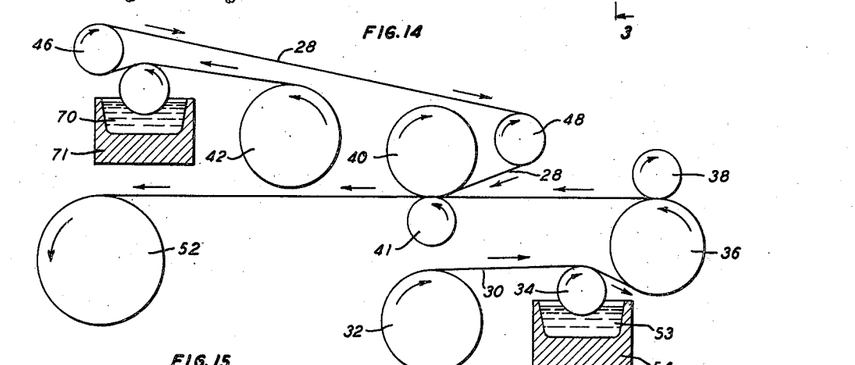
Fig. 14 is a diagram of the tape paths in Fig. 1.

To effectuate the manufacture, in continuous unlimited length, of the article shown in Figs. 15 and 16, is the immediate purpose of the apparatus disclosed in Figs. 1 to 14 inclusive. The apparatus as shown in Figs. 1 to 13 inclusive is at rest for a brief interval between the end of one cycle of operation and the beginning of the next cycle. Fig. 14 is a schematic diagram of the apparatus. In Figs. 1, 2 and 13, two parallel running tapes 30 and 31 are drawn from a pair of tape supply reels 32 and 33, to pass over corresponding waxing or adhesive applying rolls 34 and 35 respectively. Thence the tapes 30 and 31 pass under, around and over guide sheaves 36 and 37, from which the tapes pass horizontally along to a pair of press rolls 40 and 41, which are also propelling rolls to advance the tapes. Vertically over the tape guide sheaves 36 and 37, are corresponding mica pressing rolls 38 and 39.

Two other tapes 28 and 29 are drawn from twin supply reels 42 and 43 respectively, to pass over waxing or adhesive applying rolls 44 and 45 respectively. Thence the tapes 28 and 29 pass successively over guide sheaves 46 and 47 respectively and over guide sheaves 48 and 49 respectively, and thence diagonally down to meet the laminae carried by the tapes 30 and 31 as hereinafter described, and with these laminae and tapes to pass between the press rolls 40 and 41, from whence all pass together, assembled as in Figs. 15 and 16, to be wound up upon a take-up reel 52.

The above is a generalized outline of the main elements and operation of the machine. In the following the same general route will be gone over again in more detail and with added description of auxiliary elements and features. Except as hereinafter particularly noted, the tape pair 29,31 follows a course parallel to that of the tape pair 28,30 and is affected by machine elements which are twins to those affecting the tape pair 28,30. Thus the reels 32,33 are twins, so also the wax rolls 34,35, guide sheaves 36,37, and so on. Hence in the following only the tape pair 28,30 will be followed all the way through in detail, it being clear from the drawings how the tape pair 29,31 is carried along parallel thereto.

Figure 3:
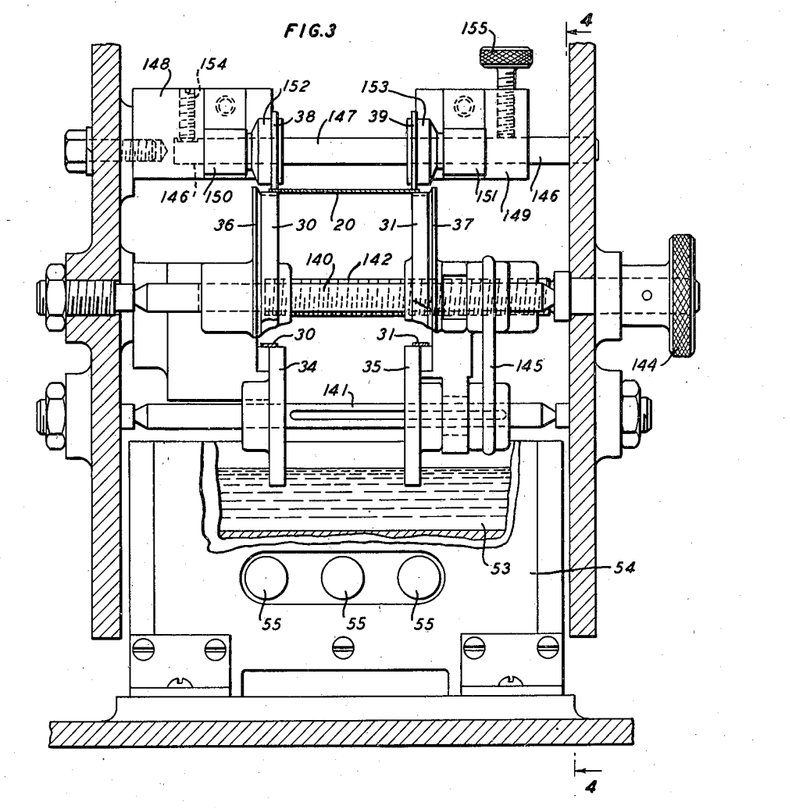
Fig. 3 is an enlarged section on the line 3—3 of Fig. 1.
Figure 4:
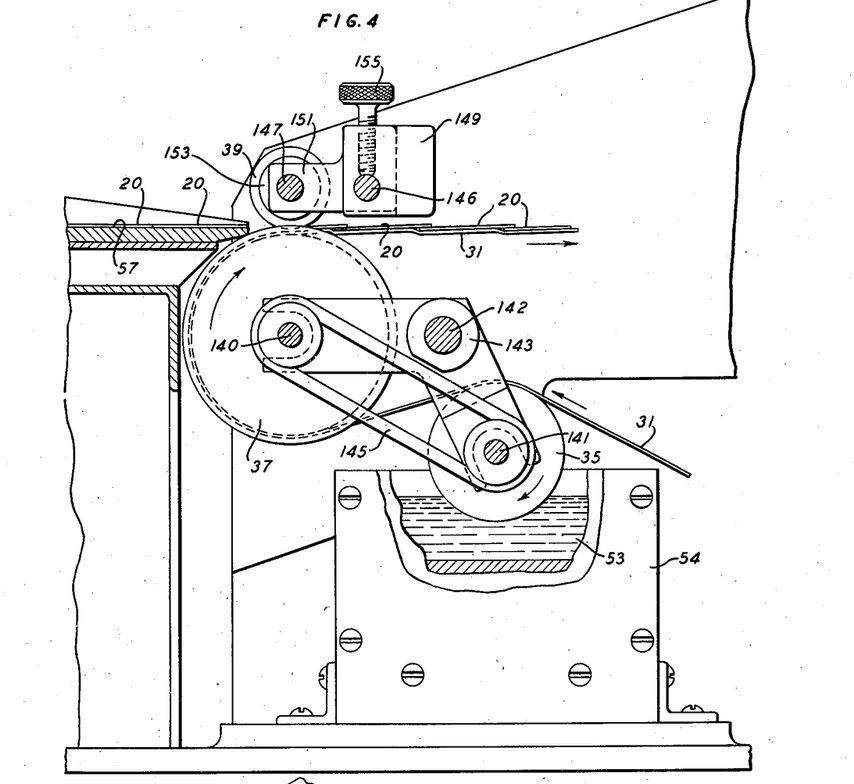
Fig. 4 is a section on the line 4—4 of Fig. 3.
Figure 5:
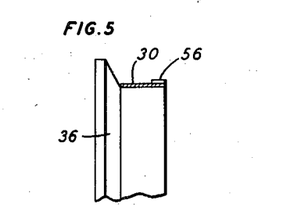
Fig. 5 is a further enlarged, broken, detached section on the line 5—5 of Fig. 1.

As noted above, the tape 30 runs from the supply reel 32 over the waxing roll 34 and under, around and over the guide sheave 36. The waxing rolls 34 and 35, as best shown in Figs. 3 and 4, dip at their lower portions into a common bath 53 of the molten wax described above and contained in an open-topped vat 54 and heated by electrical heating elements indicated at 55. The reel 32 and sheave 36 are in alignment; but the roll 34, as indicated in Figs. 2 and 3, is preferably set inward of these two so that only the inner portion of the tape 30 is waxed, as exaggeratedly indicated at 56 in Fig. 5. The tape 30 thus waxed on what is now and remains its upper surface, passes into the grip of the sheave 36 and its vertically overlying pressure roll 38. There is, in front of and delivering a little above the level of the top of the sheaves 36 and 37, a lamina feeding surface 57 supported in any suitable fashion and upon which are mica laminae 20 which are fed forward one at a time into the grip of the rolls 36,38 and 37,39. The means by which the laminae are fed are no part of the present invention, and for present purposes it may be assumed that this is done by hand.

Figure 8:
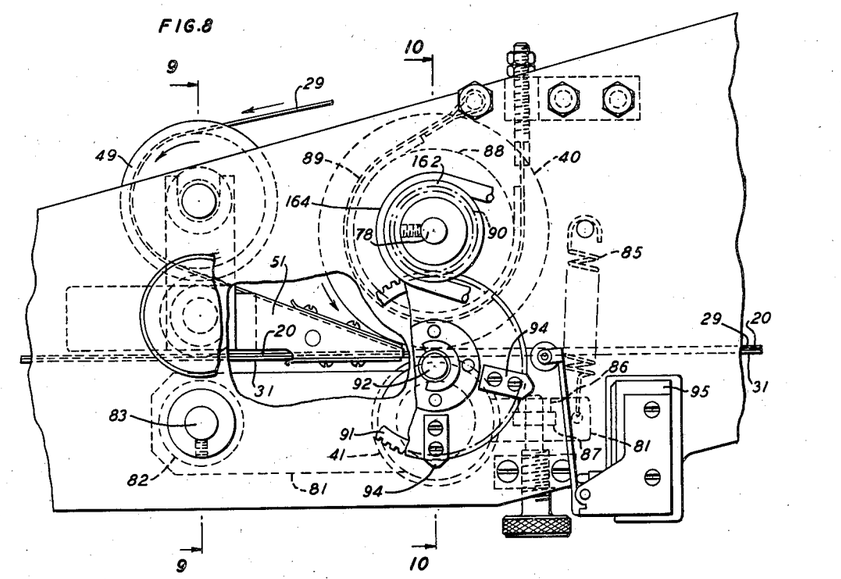
Fig. 8 is an enlarged partial, broken side elevation as indicated by the line 8—8 of Fig. 2.
Figure 9:
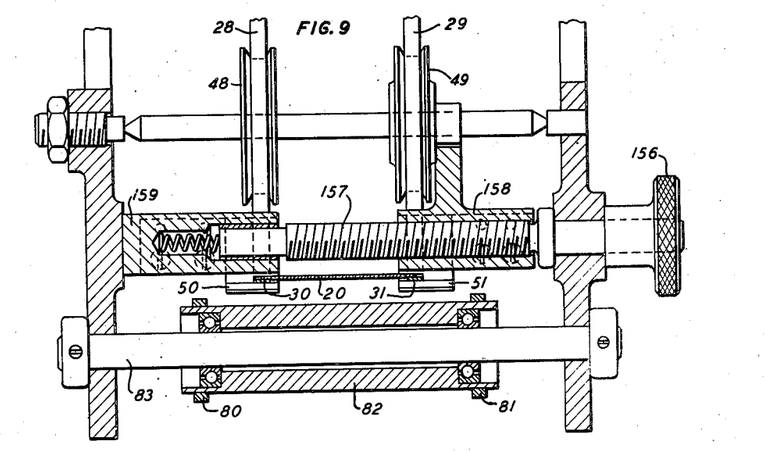
Fig. 9 is a section on the line 9—9 of Fig. 8.
Figures 10, 11:
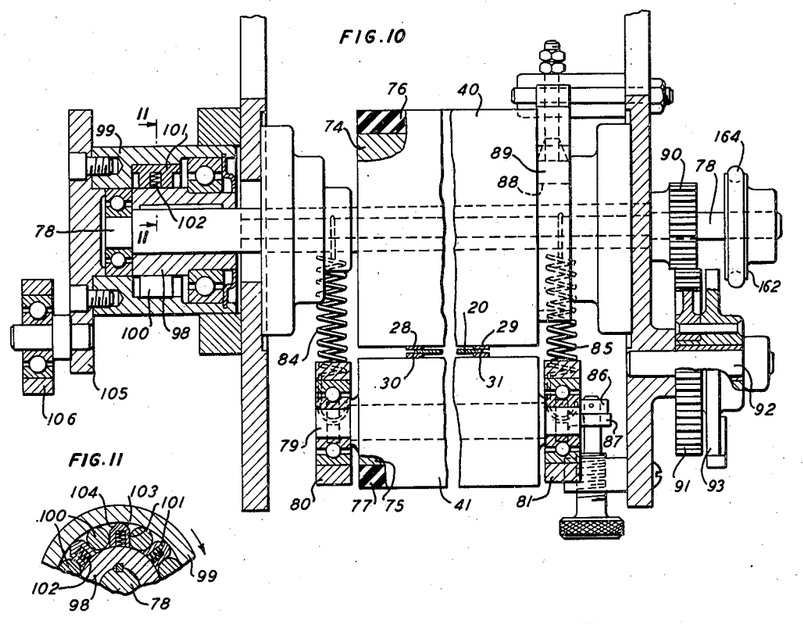
Fig. 10 is a section on the line 10—10 of Fig. 8.
Fig. 11 is a broken detached section on the line 11—11 of Fig. 10.

As hereinafter described, the operation of the machine is intermittent, there being a slight pause between each two successive cycles of operation. The cycle of operation is such that if a mica 20 be fed up into the grip of the rolls 36,38 and 37,39 as far as it will easily go when the rolls are stationary, then during the next cycle the mica will be drawn forward between the rolls together with the tapes 30 and 31 a distance equal to the length of the lamina less the width of the transverse strip on the top side thereof to be left uncoated. The cycle of operation ends and these rolls come to rest with just so much of the rear end of mica lamina still back of the rolls as is to be overlapped by the front end of the next mica. Since the front edge of the surface 57 lies a little above the level of the tops of the sheaves 36 and 37, sliding the next mica forward brings the front end of this into the grip of the rolls over the rear end of the preceding mica to provide the desired overlap. Thus the successive mica laminae 20 are laid in successive overlapping sequence on the waxed surfaces of the tapes 30 and 31 and pressed down on the fresh, soft, tacky wax by the rolls 38 and 39. From these rolls the two tapes move horizontally forward, parallel to each other and bearing the adhesively attached sequence of overlapping laminae, and enter a symmetrically twin pair of guide units 50 and 51, (Figs. 2, 8 and 12).

As best shown in Fig. 13, the guide unit 50 has a generally wedge-shaped body block 58 having an integral side lug 60 by which the unit is mounted, as hereinafter described, to stand in the position shown in Figs. 2 and 8. The units 50 and 51 are right and left symmetrical twins, the unit 51 having a body block 59 and mounting lug 61. The body block 58 of the unit 50 has a longitudinal strip of its under side cut away, as indicated at 62 in Fig. 13; and a cover plate 64 is mounted on the high part of the under face so that a channel 66 is formed extending horizontally toward the grip line of the rolls 40 and 41. The channel 66 is closed at the top, bottom and left and is open at the right, and is so dimensioned that the tape 30 and the left edge portions of the mica laminae carried on the tape can pass smoothly through the channel and thence horizontally and almost immediately into the grip of the rolls 40 and 41. In like manner the unit 51 serves to guide the tape 31 and the right edge portions of the laminae. Both units prevent vertical deviation of the tapes 30 and 31, and in accurate vertical alignment with vents deviation to the left and unit 51 to the right. Thus the two tapes and their adhesively attached burden of overlapped laminae are controlled to come to the rolls 40 and 41 along fixed individual and combined paths. In the downwardly and forwardly sloping upper surface of the block 58, is formed a longitudinal slot 68, so dimensioned as to receive and pass the tape 28 closely but easily. A cover plate 69, seated on the top face of the block, converts the slot 68 into a laterally wholly enclosed guide channel 72 for the tape 28. This channel and the corresponding channel of the unit 51 are so located as to deliver the tapes 28 and 29 to the grip of the rolls 40 and 41 so that these tapes will come to lie upon the upper surface of the lamina sequence carried by the tapes 30 and 31, and in accurate vertical alignment with the tapes 30 and 31 respectively. Thus the four tapes and the lamina sequence between them are delivered to the press rolls 40 and 41 unvaryingly in the position and mutual relation shown in Fig. 10.

Figure 6:
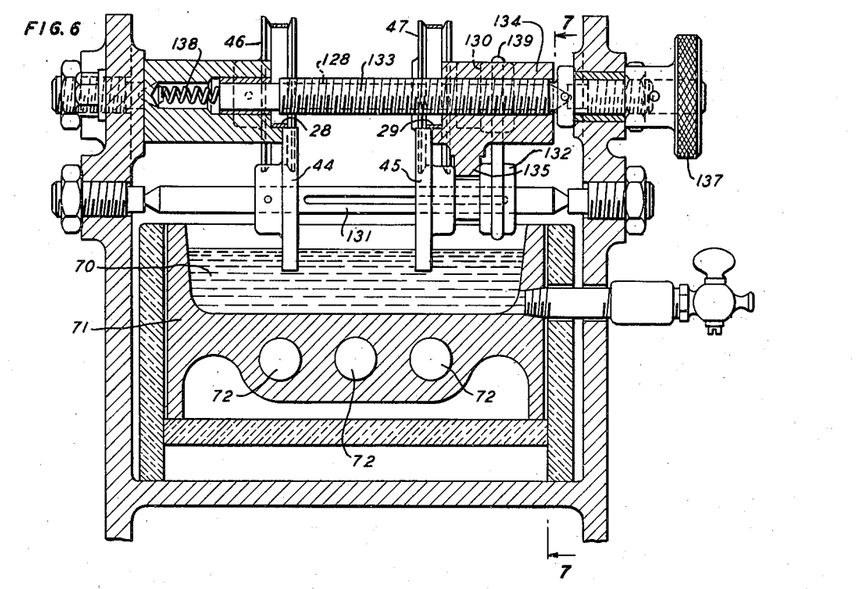
Fig. 6 is an enlarged section on the line 6—6 of Fig. 1.
Figure 7:
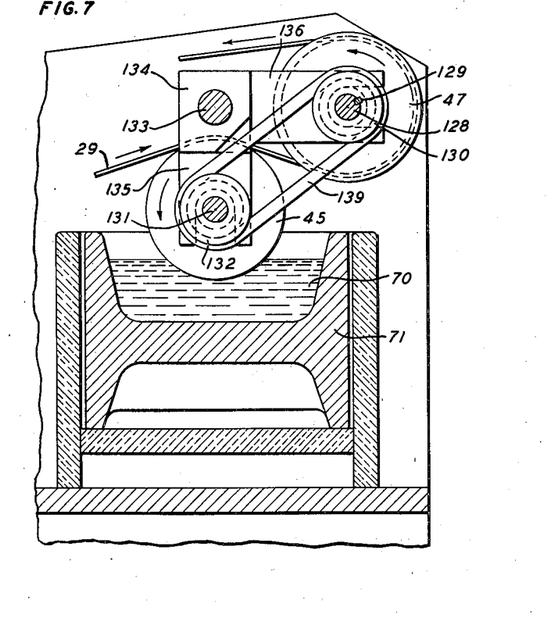
Fig. 7 is a section on the line 7—7 of Fig. 6.

As previously noted, the tapes 28 and 29 are drawn from supply reels 42 and 43 respectively, pass over waxing rolls 44 and 45, and thence by way of guide sheaves 46, 47 and 48, 49 to the guide units 50 and 51 to be delivered to the rolls 40 and 41 as just described. The lower portions of waxing rolls 44 and 45 dip into a common bath 70 of the molten wax, contained in a vat 71, heated by electrical units 72 as best shown in Figs. 6 and 7.

Turning now to Figs. 8, 9, 10 and 11, the rolls 40 and 41 each have a rigid cylindrical core, 74, and 75 respectively, and an elastically yielding surface layer, 76 and 77 respectively, of rubber, neoprene, or the like. Preferably, their circumferences are so dimensioned relatively to each other as to be nearly or in fact incommensurable, so that the same parts of the two pressure surfaces are exactly opposed to each other as infrequently as may be, to avoid permanent indenting. The roll 40 has its axle shaft 78 journalled in the frame of the machine to be rigidly fixed in position. The axle shaft 79 of the roll 41 is journalled in a pair of lever arms 80 and 81 carried by a sleeve 82 journalled on a shaft 83 rigidly mounted in the machine frame. Springs 84 and 85 force the roll 41 up toward the roll 40 to exert, yieldingly, pressure on the assembly 20, 28, 29, 30 and 31 passing between the rolls. The upward maximum excursion of the roll 41 can be adjustably limited by an adjustable stop member 86 mounted on the machine frame and which coacts with a corresponding fixed member 87 on the lever 81.

A brake drum 88 beside the roll 40 and rigid on the shaft 78, is acted on by a brake band 89 mounted on the machine frame to prevent backlash of the rolls 40 and 41 during the intervals of stoppage between cycles of operation of the machine.

A gear 90 on the shaft 78 drives a gear 91 mounted on a shaft 92 journalled in the machine frame and carrying a rigidly attached cam disk 93 on which may be mounted one or more cam lugs 94 which, in rotation, actuate a micro-switch 95 through a lever 96 and cam roll 97. The switch 95 may then be used to control a light, bell, buzzer or other means to signal the progress of a predetermined length of product or the completion of a predetermined number of cycles of operation.

On the other end of the shaft 78 is rigidly secured the inner sleeve 98 of an overrunning clutch or ratchet clutch whose concentric outer sleeve is indicated at 99. The annular space between these sleeves is filled with a circle of alternating rolls 100 and one-way locking members 101. The latter are held pressed against the outer sleeve by springs 102. Each member 101 is formed on top with a rounded slip surface 103 at the right (Fig. 11) and with a sharp angled locking ridge 104 at the left. Hence when the sleeve 99 is rotated in the direction of the arrows in Figs. 10 and 11, the angle 104 jams the member 101 between the sleeves 99 and 98, thus entraining the sleeve 98 to rotate in the same direction and drive the roll 40 as indicated by the arrows in Figs. 8, 2 and 13. But when the sleeve 99 is rotated in the other direction, it slips freely over the rounded surfaces 103 and the roll 40 is held stationary by the brake means 88, 89. Thus the clutch 98, 99 can act as a ratchet propelling means for the roll 40, practically without slip or lost motion, so that any angular displacement of the sleeve 99, if repeated, effects corresponding successive angular displacements of the sleeve 98 which are accurately equal to each other.

To the sleeve 99 is secured a driving crank 105 pivotally attached to a spring pitman 106 which in turn is eccentrically pivoted on a rotatable disk 107 which can be driven by any suitable power means. The crank 105 is formed with a stop shoulder 108 adapted to coact with a stop pin 109 carried by a rotatably adjustable plate 110 lockable by a thumb nut 111.

With the parts in the position shown, if the disk 107 be driven in constant motion, at each revolution of the disk 107, the pitman 106 will drive the crank 105 as far as the shoulder 108 and pin 109 will permit the crank to go, the continued drive of the pitman serving only to telescope its parts against its spring. Continuing past the other dead center of the pitman and disk from that shown, the pitman will elongate and also turn the crank back until the position shown is again reached. During the forward motion of the crank, the clutch 98, 99 operates to turn the roll 40 to drive the assembly 20, 28, 29, 30, 31 forward. On the return stroke of the pitman, the clutch slips freely and the roll 40 is held stationary by the brake 88, 89. Thus continuous drive of the disk 107 is converted into uniform alternation of mutually equal angular forward motions of the roll 40 and mutually equal periods of rest of the roll 40. The amount of angular forward motion of the roll 40 depends upon the position of the pin 109, which will be so adjusted as to cause the roll 40 to drive the assembly between it and the roll 41 forward by a distance equal to the length of one lamina 20 less the width of one laminar overlap at each cycle of operation. Thus the machine may be adjusted to operate with uniformly dimensional laminae of a considerable range of lengths and overlaps.

The roll 40, thus driven, drives the roll 41 and the assembly betwen them through the frictional engagement of the three. The pull thus exerted on the assembly is sufficient to draw all four tapes from their supply reels and advance them, as described, to and through the press rolls 40 and 41. Between these rolls, the assembly is sufficiently and harmlessly squeezed to snug the adhesive coated tapes against the overlapped laminae as particularly shown in Fig. 16. From the press rolls 40 and 41 the now completed assembly may be led, as shown in Fig. 2, to a take-up reel 52 driven from the shaft 78 of the roll 40 by pulleys 162 and 163 and a belt 164, the belt being sufficiently taut to keep a gentle drive on the take-up reel and sufficiently slack to slip as the material being wound builds up on the reel. Or the assembly coming from the part of the machine shown in Fig. 1 may be cut, for example, by hand, into lengths as desired.

Or, again, the assembly coming from the part of the machine shown in Fig. 1 may be coated on one or both sides with the silver mixture above described and then heated to convert the coating into an adherent film of metallic silver covering the surface of each lamina except where masked by an overlapping lamina or by one of the tapes. For present purposes these further steps of coating and heating may be thought of as being done by hand, mechanical means to effect them being no part of the present invention, although, of course, such may be provided if desired. If the tapes are of paper, textile or consumable plastic, they will be destroyed during the heating step and are thus disposed of, leaving each of the coated laminae substantially as shown in Fig. 17. If the tapes are of metal such as aluminum, copper, or the like, the completed laminae will be removed from them, for example, by hand, after the assembly has cooled from the heating step.

It will be noted, best perhaps from Fig. 2, that the various twin pairs of reels, sheaves and guides which control the motion of the four tapes are so disposed the lateral distance between the tapes 28 and 29 is always the same as that between the tapes 30 and 31, and that this distance is constant throughout the travel of the tapes. As indicated by Figs. 15 and 16, this distance is determined in any given case by the width of the laminae 20 to be operated on, and must be adjustably changed when micas or laminae of other widths are in question. To accomplish such change is the purpose of the arrangement particularly illustrated in Figs. 6, 9 and 12.

Fig. 12 is in fact a vertical axial section through the supply reels 42 and 43 from which the tapes 28 and 29 are drawn. The structure of the reels 32 and 33 which supply the tapes 30 and 31 is in all material matters the same, and the ensuing description of the mounting and adjustability of the reels 42 and 43 applies also to those of the reels 32 and 33.

The reels 42 and 43 are mounted to be freely rotatable on cylindrical journal blocks 112 and 113. The block 112 has a friction flange 114 against which the reel 42 is resiliently urged by a spring 116 backed by a nut 118. In the case of the reel 43, the friction flange 115 is on the nut 119 which is threaded on the block 113, and the friction spring 117 is compressed between the reel 43 and a shoulder 63 on the journal block 113. The block 112 is yieldably and removably keyed, as indicated at 122, on a shaft 120 to be ordinarily stationary thereon. The shaft 120 is threaded over its major and central portion as shown in Fig. 12, and a nut-like support 121 is threadedly engaged on and carried by the shaft 120, on which support the journal block 113 is yieldably and removably keyed as indicated at 123. The shaft 120 is mounted in a suitable part 124 of the frame, as shown in Fig. 12, to be rotatable but not axially slidable therein. The nut 121, which carries the journal block 113 and with it the reel 43, has an extended lug 125 in which is rigidly mounted a pin 126 slidable in a corresponding bore in the member 124 to prevent the nut 121 from rotating. On the outer end of the shaft 120 is a knurled head 127 for rotating the shaft to adjust the nut 121 along the shaft and thereby shift the reel 43 adjustably toward or from the reel 42.

Fig. 6 shows a vertical axial section through the mounting of the adjusting screw for the sheave 47 and roll 45, and an elevation from the rear of the mounting of the waxing rolls 44 and 45. A description of these arrangements will suffice to describe also the arrangements for mounting the guide sheaves 36 and 37 and the waxing rolls 34 and 35, which are mechanically the same. Keeping Figs. 6 and 7, and also Fig. 2, in view, the guide sheaves 46 and 47 are mounted on a common shaft 128, the sheave 46 being rigidly secured to the shaft, but the sheave 47 being freely slidable along the shaft although keyed to it as at 129 (Fig. 7) to rotate with it. On the outer side of the sheave 47 and either integral with it or rigidly secured to it, is a double grooved pulley 130. The two waxing rolls 44 and 45 are also mounted on a common shaft 131, the roll 44 rigidly, and the roll 45 slidably but keyed to rotate with the shaft. On the outer side of the roll 45 is a double grooved pulley 132 integral with or rigidly secured to the roll. A threaded shaft 133, suitably journalled in the machine frame parallel to the shafts 128 and 131, is located preferably over the shaft 131 and level with the shaft 128. A nut 134 carries a depending yoke 135 which enters one of the grooves of the pulley 132, and a laterally extending yoke 136 which enters one of the grooves of the pulley 130. Thus movement of the nut by rotation of the shaft 133 adjusts the sheave 47 and the roll 45 simultaneously and equally toward or from the sheave 46 and the roll 44 respectively. The shaft 133 is rotatable for adjustment by means of a knurled head 137; and the shaft is frictionally held in adjusted position by a spring 138. The sheaves 46 and 47 are driven in rotation by the tapes 28 and 29 being drawn over them. A belt 139 running over the pulleys 130 and 132 then drives the shaft 131 and therewith the rolls 44 and 45 in a direction contrary to the motion of the tapes as indicated by the arrows in Fig. 7.

The arrangements for adjusting the sheave 37 and roll 35 relatively to the sheave 36 and roll 34 are substantially like those just described for the sheave 47 and roll 45 and so are not shown in detail in Fig. 3. The sheaves 36 and 37 are mounted on a shaft 140, the rolls 34 and 35 on a shaft 141; and a threaded shaft 142 carries a nut 143 which serves to shift the sheave 37 and roll 35 simultaneously and equally when the knurled head 144 on the shaft 142 is turned. A belt 145 serves to drive the shaft 141 from the shaft 140 and thus to rotate the rolls 34 and 35 against the motion of the tapes 30 and 31.

Above and back of the shaft 140, is a rod 146 fixed in the machine frame parallel to the shaft 140. On this rod are mounted two blocks 148 and 149 having forwardly extending arms 150 and 151 respectively in which is positioned a shaft 147 carrying the rolls 38 and 39. The roll 38 is mounted on the outer race of a ball bearing unit 152, whose inner race is attached to the arm 150 and is stationary on the shaft 147. The roll 39 is mounted on the outer face of a ball bearing unit 153, whose inner race is attached to the arm 151 and with this is slidable along the shaft 147. The block 148 is locked on the bar 146 by a set screw 154, while the block 149 is adjustably locked on the bar 146 by a jam screw 155. By adjusting the position of the block 149 along the bar 146, the position of the roll 39 relatively to the sheave 37 may be made correct when the position of the latter is changed.

The mode of adjustment of the guide sheave 49 toward or from the guide sheave 48 (Fig. 9) will not need particular elucidation after the above. The knurled head 156 is means to effect this adjustment in the same manner that the head 137 (Figs. 6 and 7) is means to adjust the sheave 47 toward or from the sheave 46. Additionally, however, the nut 158 on the threaded shaft 157 turned by the head 156 also carries the tape guide unit 51, which is thus adjustable with the sheave 49 equally toward and from the guide unit 50 which is mounted on the stationary member 159 which supports the outer end of the screw 157.

From the above, it will be clear that, in the operation of the apparatus as illustrated and described, two tapes are drawn from supplies, are coated with adhesive on one surface, and are advanced horizontally with their coated sides up. Successive laminae are laid on the adhesive upper sides of the tape in overlapping sequence and are pressed down on the tapes to make the laminae adhere to the tapes at least firmly enough to avert accidental misplacement of laminae relatively to the tapes or to each other. A second pair of tapes having adhesive along their under sides, is brought down from above to lie upon the sequence of laminae respectively directly over the tapes on which the laminae lie and the whole is subjected to sufficient pressure to cause the four tapes with the sequence of overlapped laminae held by them, to become a coherent and manipulable article. The article thus created (Figs. 15 and 16) may be an end product in itself. It may be rolled up, or cut into lengths, packed and stored or shipped. On the other hand, it may be only an intermediate product and subjected, as formed, to further steps of coating on its upper and lower faces, or on either alone, with silvering material, heated to metallize the coating and to destroy the tapes if destructible by heat, or have the silvered and finished laminae removed from the tapes if these are indestructible. The end product is then the individual silvered laminae (Fig. 17).

It may occasionally be desired to coat one face only of the laminae. In such case the upper pair of tapes 28, 29 may be omitted and the operations carried through as described above and using the same apparatus. The assembly consisting then of the tapes 30 and 31 bearing on their upper faces the sequence of laminae 20, will then be sprayed or painted with the silver oxide preparation on the under side only, and then heated as before.

The invention has been disclosed by describing and illustrating a particular apparatus or machine for carrying out the steps involved; but the invention is not so limited. It is capable of variation and modification within its spirit and scope as pointed out in the appended claims.

What is claimed is:

1. The method of making metal coated laminae of dielectric material not destructible by heat which method comprises steps of advancing a pair of tapes of heat destructible material and having adhesive material on the same face of each, applying on the adhesive bearing faces of the tapes a plurality of the dielectric laminae in sequence, coating one face of the assembly so formed with material convertible by heat into an adherent metallic film thereon, and heating the coated assembly to convert the coating into adherent metallic film and to destroy the tapes.

2. The method of making metal coated laminae of dielectric material not destructible by heat which method comprises steps of advancing a pair of tapes of heat destructible material and having adhesive material on the same face of each, applying on the adhesive bearing faces of the tapes a plurality of the dielectric laminae in overlapping sequence, coating one face of the assembly so formed with material convertible by heat into a metallic film thereon, and heating the coated assembly to convert the coating into metallic film and to destroy the tapes.

ALAN T. CHAPMAN.
VINCENT F. D'AGOSTINO.

REFERENCES CITED

The following references are of record in the file of this patent:

UNITED STATES PATENTS

| Number | Name | Date |
| --- | --- | --- |
| 1,297,643 | Boyer | Mar. 18, 1919 |
| 1,781,877 | Levin | Nov. 18, 1930 |
| 1,954,353 | Ernst | Apr. 10, 1934 |
| 1,984,911 | Banks | Dec. 18, 1934 |
| 2,058,035 | Rand | Oct. 20, 1936 |
| 2,217,199 | Emmey | Oct. 8, 1940 |
| 2,283,705 | Stewart | May 19, 1942 |
| 2,338,058 | Read | Dec. 28, 1943 |
| 2,351,974 | Kollmar | June 20, 1944 |